(12) United States Patent
Wu et al.

(10) Patent No.: US 11,952,467 B2
(45) Date of Patent: Apr. 9, 2024

(54) METHOD FOR PROCESSING POLYALKYLENE BENZENEDICARBOXYLATE MATERIAL

(71) Applicant: National Taiwan University, Taipei (TW)

(72) Inventors: Chia-Wen Wu, Taipei (TW); Wei-Sheng Liao, Taipei (TW); Yu-Wen Chiao, Taipei (TW)

(73) Assignee: National Taiwan University, Taipei (TW)

( * ) Notice: Subject to any disclaimer, the term of this patent is extended or adjusted under 35 U.S.C. 154(b) by 194 days.

(21) Appl. No.: 17/650,325

(22) Filed: Feb. 8, 2022

(65) Prior Publication Data

US 2022/0251325 A1 Aug. 11, 2022

Related U.S. Application Data

(60) Provisional application No. 63/192,593, filed on May 25, 2021.

(30) Foreign Application Priority Data

Feb. 9, 2021 (TW) .................................. 110105074

(51) Int. Cl.
*C08J 11/08* (2006.01)

(52) U.S. Cl.
CPC ............ *C08J 11/08* (2013.01); *C08J 2367/02* (2013.01)

(58) Field of Classification Search
USPC ........................................................ 521/48.5
See application file for complete search history.

(56) References Cited

U.S. PATENT DOCUMENTS

| | | | |
|---|---|---|---|
| 4,003,881 A | 1/1977 | Sidebotham et al. | |
| 4,165,420 A | 8/1979 | Rinehart | |
| 7,380,735 B2 | 6/2008 | Hayward et al. | |
| 9,890,261 B2 | 2/2018 | Besse et al. | |

FOREIGN PATENT DOCUMENTS

| | | | | |
|---|---|---|---|---|
| CN | 1162462 C | | 8/2004 | |
| CN | 101906218 A | * | 12/2010 | |
| CN | 105051097 A | | 11/2015 | |
| CN | 105623218 B | | 7/2018 | |
| EP | 662466 B1 | * | 3/1997 | ............. C07C 51/09 |
| JP | 6659919 B1 | * | 3/2020 | ............. C08G 63/90 |
| TW | I647082 B | | 1/2019 | |
| WO | 2021/028695 A1 | | 2/2021 | |

OTHER PUBLICATIONS

JP-6659919-B1 Machine Translation (Year: 2020).*
EP-662466B1 Machine Translation (Year: 1995).*
CN-101906218 Machine Translation (Year: 2010).*
Search Report appended to an Office Action, which was issued to Taiwanese counterpart application No. 111115377 by the TIPO dated Jan. 7, 2023, with an English translation thereof.
Karayannidis et al. "Solid-state Polycondensation of Poly ( Ethylene Terephthalate) Recycled from Postconsumer Soft-Drink Bottles. I." (1993), J. Appl. Polym. Sci., (50):2135-2142 (8 pages).

* cited by examiner

*Primary Examiner* — Terressa Boykin
(74) *Attorney, Agent, or Firm* — Osha Bergman Watanabe & Burton LLP

(57) ABSTRACT

A method for processing a polyalkylene benzenedicarboxylate material includes subjecting a polyalkylene benzenedicarboxylate material to an immersion treatment with an immersion liquid including ethylene glycol, so as to obtain an immersed polyester material, and subjecting the immersed polyester material to a disintegration treatment to obtain a disintegrated polyester material. The immersed polyester material has crystallinity higher than that of the polyalkylene benzenedicarboxylate material.

20 Claims, 4 Drawing Sheets

| Comparative Method 1-1 | Comparative Method 1-2 | Comparative Method 1-3 |
|---|---|---|
|  |  |  |
| Comparative Method 1-4 | Comparative Method 1-5 | Comparative Method 1-6 |
|  |  |  |
| Comparative Method 1-7 | Comparative Method 1-8 | |
|  |  | |

| Exemplary Method 1-1  | Exemplary Method 1-2  | Exemplary Method 1-3  |
|---|---|---|
| Exemplary Method 1-4  | Exemplary Method 1-5  | Exemplary Method 1-6  |
| Exemplary Method 1-7  | Exemplary Method 1-8  | |

METHOD FOR PROCESSING POLYALKYLENE BENZENEDICARBOXYLATE MATERIAL

CROSS-REFERENCE TO RELATED APPLICATION

This application claims priority of U.S. Provisional Application No. 63/192,593, filed on May 25, 2021, and priority of Taiwanese Patent Application No. 110105074, filed on Feb. 9, 2021.

FIELD

The disclosure relates to a method for processing a polyester material, and more particularly to a method for processing a polyalkylene benzenedicarboxylate material.

BACKGROUND

Regarding methods for recycling and processing polyethylene terephthalate (PET) bottle flakes, the PET bottle flakes are subjected to a crushing process to obtain polyester particles having a smaller size, no matter whether a physical recycling technique or a chemical recycling technique is applied. Normally, the smaller the PET polyester particles, the more significant improvement the processing efficiency will have, no matter whether a physical recycling technique or a chemical recycling technique is applied.

However, PET bottle flakes, which have great toughness, are difficult to be effectively crushed. For example, when industrial crushers or grinders are applied, crushed or ground polyester products have a millimeter (mm) size. In addition, water is required to reduce the temperature during the processing, and it is necessary to replace or sharpen cutting tools of crushers and grinders periodically due to abrasion. In order to obtain crushed or ground polyester products have a micrometer ($\mu m$) size, liquid nitrogen is required. Therefore, conventional processing methods need a complicated processing equipment, and consume a great amount of liquid nitrogen.

Furthermore, a solvent may be used to reduce the size of PET bottle flakes to a micrometer scale. For instance, as reported in Karayannidis et al. (1993), *J. Appl. Polym. Sci.*, (50):2135-2142, PET bottle flakes were dissolved in a solvent having a predetermined temperature, following by contact with an anti-solvent. Therefore, PET precipitated. Even though the use of the solvent could result in PET particles having a smaller size, the solvent used was an organic solvent and a large amount of such solvent was used, causing the processing to have a high cost and to be not environmentally friendly.

U.S. Pat. No. 4,165,420 discloses a method for solid state polymerization of a polyester resin, which includes introducing a molten polyester prepolymer with a low molecular weight into a centrifugal atomizer device in a spray congealer so as to form spherical polymer particles having a high molecular weight and a particle size of from 100 to 250 microns. Even though the method of U.S. Pat. No. 4,165,420 can lead to polyester particles having a small size, such method is energy-consuming and requires a processing equipment that is complicated and difficult to maintain.

Moreover, U.S. Pat. No. 7,380,735 discloses a method for preparing small PET particles, which includes increasing crystallinity of PET flakes by heating the PET flakes to 150° C. or higher in air, and comminuting, by impact fracturing, the PET flakes to prepare small PET particles having an average particle size less than about 500 microns. Even though the method of U.S. Pat. No. 7,380,735 can result in small PET particles, such method requires the aforesaid high temperature to increase the crystallinity and hence is energy-consuming, and needs a long time of heating and hence is time-consuming. In addition, the aforesaid high temperature might give rise to a side reaction, adversely affecting the quality of the PET flakes as well as the PET particles prepared therefrom.

Lastly, CN 1162462 C discloses a method for preparing fine or superfine rubber powder from waste rubber, which includes forming rubber particles or strips having a size of 5 to 40 mesh from waste rubber, conducting immersion with a polar organic solvent for a certain time period, and conducting dry grinding or wet grinding after the rubber particles or strips become brittle. Therefore, fine rubber powder (having a size of 60 to 200 mesh) or superfine rubber powder (having a size of 200 mesh or higher) can be prepared. However, the method of CN 1162462 C is still unsatisfactory.

In view of foregoing, there is still a need to develop a more satisfactory method for processing a polyalkylene benzenedicarboxylate material such as a PET material.

SUMMARY

Therefore, an object of the disclosure is to provide a method for processing a polyalkylene benzenedicarboxylate material, which can alleviate at least one of the drawbacks of the prior art. The method includes:
  subjecting a polyalkylene benzenedicarboxylate material to an immersion treatment with an immersion liquid including ethylene glycol, so as to obtain an immersed polyester material, the immersed polyester material having crystallinity higher than that of the polyalkylene benzenedicarboxylate material; and
  subjecting the immersed polyester material to a disintegration treatment to obtain a disintegrated polyester material.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
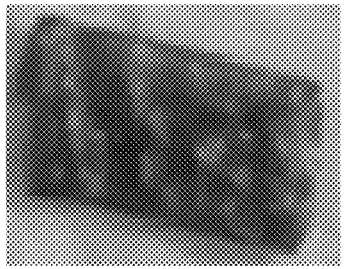
FIG. 1 shows appearance of comparative impact-fractured polyester materials obtained using Comparative Methods 1-1 to 1-8.
Figure 1:
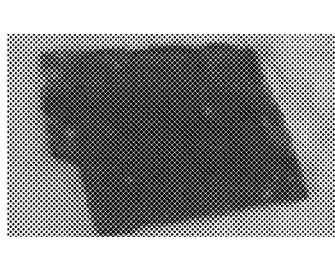
Figure 1:
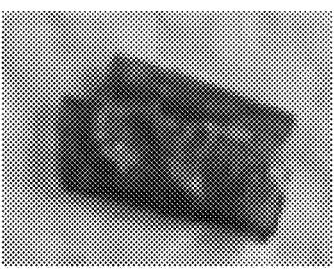
Figure 1:
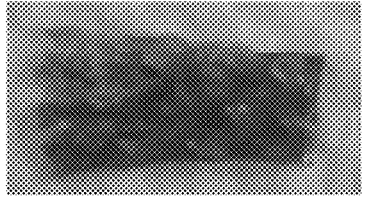
Figure 1:
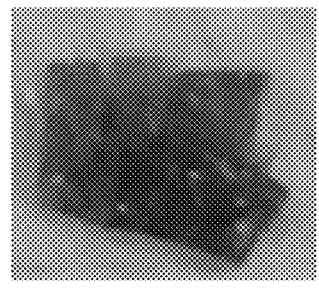
Figure 1:
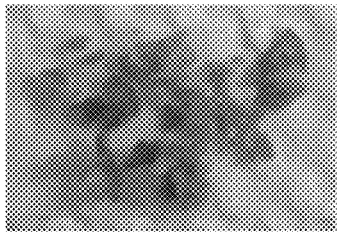
Figure 1:
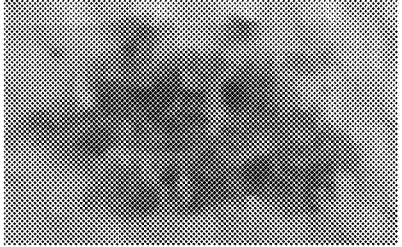
Figure 1:
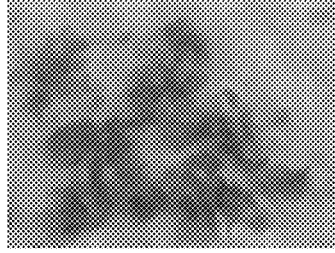

The present disclosure provides a method for processing a polyalkylene benzenedicarboxylate material, which includes:

subjecting a polyalkylene benzenedicarboxylate material to an immersion treatment with an immersion liquid including ethylene glycol, so as to obtain an immersed polyester material, the immersed polyester material having crystallinity higher than that of the polyalkylene benzenedicarboxylate material; and subjecting the immersed polyester material to a disintegration treatment to obtain a disintegrated polyester material.

Examples of the polyalkylene benzenedicarboxylate material include, but are not limited to, a polyethylene terephthalate (PET) material, a polyethylene isophthalate (PEI) material, and a polyethylene phthalate (PEP). In certain embodiments, the polyalkylene benzenedicarboxylate material is the PET material.

According to the present disclosure, the polyalkylene benzenedicarboxylate material may be a transparent PET bottle or a colorized PET bottle. Examples of the transparent PET bottle and the colorized PET bottle include, but are not limited to, an unused PET bottle and a used, waste PET bottle. In certain embodiments, the polyalkylene benzenedicarboxylate material is a bottle flake prepared by cutting a used, waste PET bottle, and having a size of 1 cm×1 cm.

During the immersion treatment, the immersion liquid changes the molecular structure of the polyalkylene benzenedicarboxylate material, so as to enhance the crystallinity. In certain embodiments, the immersion liquid further includes a functional agent. Examples of the functional agent include, but are not limited to, a phenyl ether compound. Examples of the phenyl ether compound include, but are not limited to,

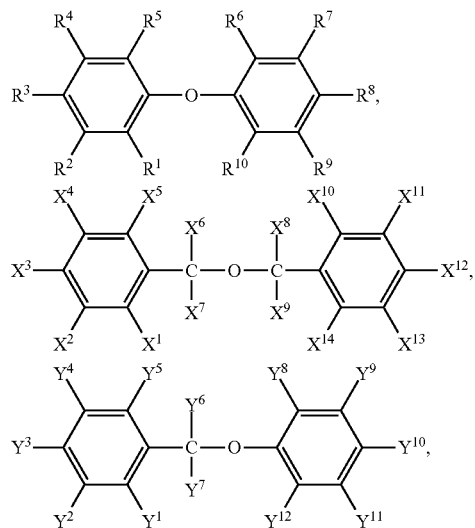

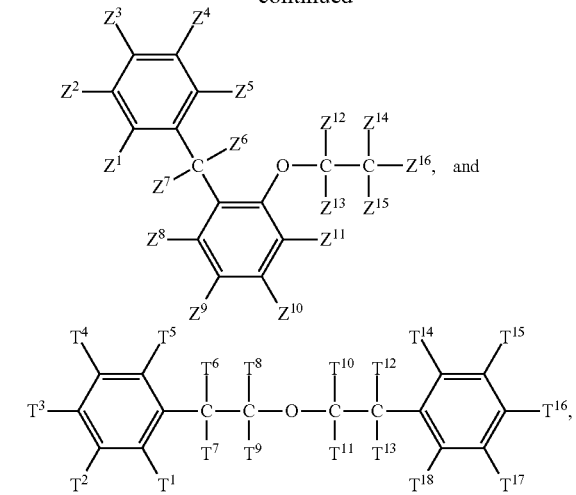

where $R^1$, $R^2$, $R^3$, $R^4$, $R^5$, $R^6$, $R^7$, $R^8$, $R^9$, $R^{10}$, $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $Y^1$, $Y^2$, $Y^3$, $Y^4$, $Y^5$, $Y^6$, $Y^7$, $Y^8$, $Y^9$, $Y^{10}$, $Y^{11}$, $Y^{12}$, $Z^1$, $Z^2$, $Z^3$, $Z^4$, $Z^5$, $Z^6$, $Z^7$, $Z^8$, $Z^9$, $Z^{10}$, $Z^{11}$, $Z^{12}$, $Z^{13}$, $Z^{14}$, $Z^{15}$, $T^1$, $T^2$, $T^3$, $T^4$, $T^5$, $T^6$, $T^7$, $T^8$, $T^9$, $T^{10}$, $T^{11}$, $T^{12}$, $T^{13}$, $T^{14}$, $T^{15}$, $T^{16}$, $T^{17}$, and $T^{18}$ are independently selected from the group consisting of hydrogen and a hydrocarbon group. The hydrocarbon group may be an alkyl group.

In certain embodiments, based on a total volume (i.e. 100% v/v) of the immersion liquid, ethylene glycol is present in an amount that is larger than 90% v/v and not larger than 100% v/v.

In certain embodiments, the immersion treatment is conducted at a temperature ranging from 150° C. to 195° C. for 0.5 minute to 480 minutes.

In certain embodiments, the immersion treatment is conducted under atmospheric pressure.

The disintegration treatment refers to a treatment that renders the polyalkylene benzenedicarboxylate material disintegrated (for instance, fractured, cracked, unsolid, or crumbled). Furthermore, for example, through the disintegration treatment, a single flake may be broken down into powder or fragmented into several completely separate fragments. Examples of the disintegration treatment include, but are not limited to, an impact fracturing treatment. In certain embodiments, the impact fracturing treatment is conducted using a hammer.

According to the present disclosure, the disintegrated polyester material may have a size of 0.5 mm or smaller. In certain embodiments, the disintegrated polyester material may have a size ranging from 100 μm to 500 μm. In other embodiments, the disintegrated polyester material may have a size ranging from 100 μm to 200 μm.

In certain embodiments, the polyalkylene benzenedicarboxylate material is colorized by a colorant, and the disintegrated polyester material obtained from the polyalkylene benzenedicarboxylate material hence is colorized by the colorant. Under such circumstance, the processing method further includes subjecting the disintegrated polyester material to a decolorization treatment so as to remove the colorant from the disintegrated polyester material to obtain a decolorized polyester material.

According to the present disclosure, the decolorization treatment may be selected from the group consisting of a chemical decolorization treatment and a physical decolorization treatment.

Examples of the chemical decolorization treatment include, but are not limited to, an oxidation decolorization treatment which employs an oxidant. Since the oxidant is well-known and commonly used in the art, the detail thereof is omitted herein for the sake of brevity.

Examples of the physical decolorization treatment include, but are not limited to, a solvent extraction treatment and a solvent vapor treatment. The solvent extraction treatment employs a liquid solvent for the same to contact the disintegrated polyester material, so that the colorant on the disintegrated polyester material is dissolved and removed therefrom. The solvent vapor treatment employs a gaseous solvent for the same to contact the disintegrated polyester material, so that the colorant on the disintegrated polyester material is dissolved and removed therefrom. In certain embodiments, the physical decolorization treatment is the solvent extraction treatment.

According to the present disclosure, the physical decolorization treatment may be conducted using a decolorization composition that includes at least one decolorization agent selected from the group consisting of ethylene glycol,

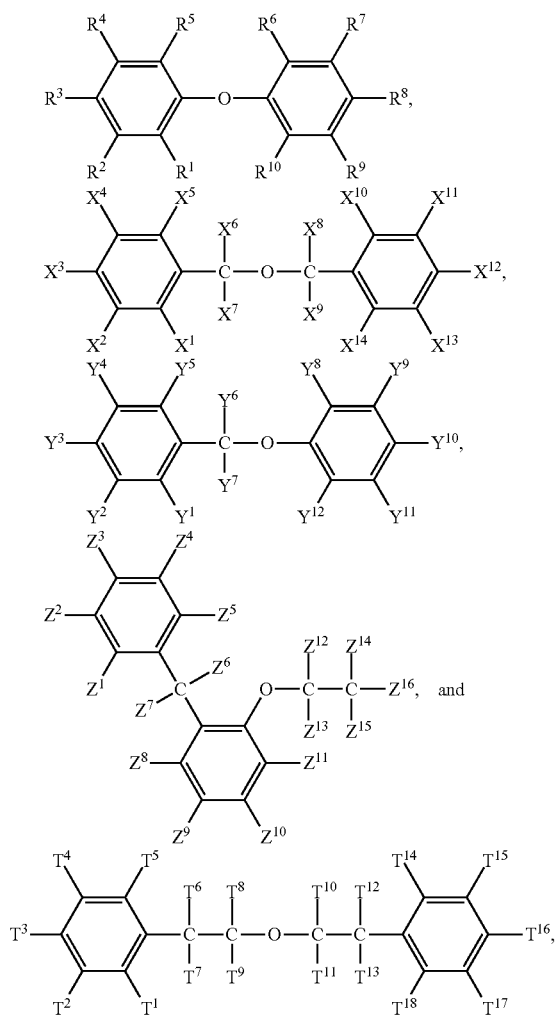

where $R^1$, $R^2$, $R^3$, $R^4$, $R^5$, $R^6$, $R^7$, $R^8$, $R^9$, $R^{10}$, $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $Y^1$, $Y^2$, $Y^3$, $Y^4$, $Y^5$, $Y^6$, $Y^7$, $Y^8$, $Y^9$, $Y^{10}$, $Y^{11}$, $Y^{12}$, $Z^1$, $Z^2$, $Z^3$, $Z^4$, $Z^5$, $Z^6$, $Z^7$, $Z^8$, $Z^9$, $Z^{10}$, $Z^{11}$, $Z^{12}$, $Z^{13}$, $Z^{14}$, $Z^{15}$, $T^1$, $T^2$, $T^3$, $T^4$, $T^5$, $T^6$, $T^7$, $T^8$, $T^9$, $T^{10}$, $T^{11}$, $T^{12}$, $T^{13}$, $T^{14}$, $T^{15}$, $T^{16}$, $T^{17}$, and $T^{18}$ are independently selected from the group consisting of hydrogen and a hydrocarbon group. The hydrocarbon group may be an alkyl group. In certain embodiments, the at least one decolorization agent is selected from the group consisting of ethylene glycol, diphenyl ether, dibenzyl ether, benzyl phenyl ether, benzyl 2-phenetole, and

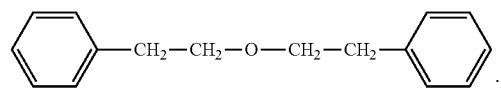

.

In certain embodiments, the decolorization composition further includes a functional agent. Examples of the functional agent include, but are not limited to, the solvent used in the solvent extraction treatment.

In certain embodiments, based on a total volume (100% v/v) of the decolorization composition, the at least one decolorization agent is present in an amount that is larger than 90% v/v and not larger than 100% v/v.

According to the present disclosure, the physical decolorization treatment may be conducted at a temperature lower than a boiling point of the decolorization composition. In certain embodiments, the physical decolorization treatment is conducted at a temperature of 230° C. or lower for 0.5 minute to 480 minutes. In other embodiments, the physical decolorization treatment is conducted at a temperature ranging from 100° C. to 195° C.

According to the present disclosure, the decolorization treatment may be conducted under atmospheric pressure.

The following should be noted. U.S. Pat. No. 4,003,881 discloses a method for decolorizing a polyester, which includes conducting a decolorization treatment with ethylene glycol (serving as a decolorization agent) at 190° C. However, the decolorization effect of the method of U.S. Pat. No. 4,003,881 is unsatisfactory. Moreover, U.S. Pat. No. 9,890,261 discloses another method for decolorizing a polyester, which includes brining a polyester into contact with ethylene glycol vapor at 195° C. or higher to achieve a decolorization effect. U.S. Pat. No. 9,890,261 also discloses that when a polyester is subjected to a decolorization treatment by immersion in liquid ethylene glycol at 120° C. to 180° C., the decolorization effect is unsatisfactory. In view of the foregoing, when a polyester is directly subjected to a decolorization treatment at 190° C. or lower, the decolorization effect is unsatisfactory. In contrast to the processing method of the present disclosure, in which the polyalkylene benzenedicarboxylate material is subjected first to an immersion treatment and a disintegration treatment and then to a decolorization treatment, the decolorization effect is greatly improved (as demonstrated by the examples of the present disclosure below). With the processing method of the present disclosure, decolorization can be accomplished even at 180° C. within 1 hour. Therefore, compared to U.S. Pat. Nos. 4,003,881 and 9,890,261, the processing method of the present disclosure not only can bring about a satisfactory decolorization effect, but also can achieve the same decolorization effect in a short time period, reducing energy consumption.

In certain embodiments, the processing method further includes conducting a depolymerization treatment after the disintegration treatment. Such depolymerization treatment may be conducted on the disintegrated polyester material or the decolorized polyester material (i.e. after the disintegration treatment or even after the decolorization treatment thereafter).

Examples of the depolymerization treatment include, but are not limited to, an alcoholysis treatment, a hydrolysis treatment, an aminolysis treatment, and an ammonolysis treatment.

The alcoholysis treatment may be conducted using, for example, an alcohol-type chain-breaking agent such as ethylene glycol and methanol.

Examples of the hydrolysis treatment include an alkaline hydrolysis treatment, an acidic hydrolysis treatment, and a neutral hydrolysis treatment. The alkaline hydrolysis treatment may be conducted using an alkaline aqueous solution that is well-known and commonly used in the art (therefore, the detail of the alkaline aqueous solution is omitted herein for the sake of brevity). The acidic hydrolysis treatment may be conducted using an acidic aqueous solution that is well-known and commonly used in the art (therefore, the detail of the acidic aqueous solution is omitted herein for the sake of brevity). The neutral hydrolysis treatment may be conducted using a neutral aqueous solution that is well-known and commonly used in the art (therefore, the detail of the neutral aqueous solution is omitted herein for the sake of brevity).

The aminolysis treatment may be conducted using an amine-type chain-breaking agent that is well-known and commonly used in the art, for instance, a primary amine, a secondary amine, and a tertiary amine (therefore, the detail of the amine-type chain-breaking agent is omitted herein for the sake of brevity).

The ammonolysis treatment may be conducted using a chain-breaking agent that is ammonia ($NH_3$).

In certain embodiments, the depolymerization treatment is the alcoholysis treatment.

In certain embodiments, the alcoholysis treatment is conducted using an alcoholysis composition that includes ethylene glycol. The alcoholysis composition may further include a functional agent. Examples of the functional agent include, but are not limited to, a phenyl ether compound. The phenyl ether compound may be that used in the immersion liquid. Based on a total volume (i.e. 100% v/v) of the alcoholysis composition, ethylene glycol may be present in an amount that is larger than 90% v/v and not larger than 100% v/v.

The alcoholysis treatment may be conducted at a temperature lower than a boiling point of the alcoholysis composition. In certain embodiments, the alcoholysis treatment is conducted at a temperature of 196° C. or lower for 0.5 minute to 480 minutes. In other embodiments, the alcoholysis treatment is conducted at a temperature ranging from 160° C. to 196° C.

In certain embodiments, the depolymerization treatment is conducted under atmospheric pressure.

In certain embodiments, the depolymerization treatment is conducted in the presence of a metal catalyst. Examples of the metal catalyst include, but are not limited to, a metal, a metal oxide, a metal chloride, and a metallic salt of an acid.

Examples of the metal include, but are not limited to, a zinc metal. The zinc metal can facilitate the progress of the depolymerization treatment. In addition, when the decolorized polyester material still has a residue of the colorant thereon, during the depolymerization treatment, the zinc metal can facilitate the degradation of the residual colorant in the presence of ethylene glycol so as to remove the residual colorant from the decolorized polyester material. In certain embodiments, the zinc metal is a zinc electrode of a zinc-carbon battery.

Examples of the metal oxide include, but are not limited to, zinc oxide.

Examples of the metal chloride include, but are not limited to, zinc chloride.

Examples of the metallic salt of an acid include, but are not limited to, zinc acetate.

The present disclosure will be further described by way of the following examples. However, it should be understood that the following examples are intended solely for the purpose of illustration and should not be construed as limiting the present disclosure in practice.

A1. Exemplary and Comparative Methods for Processing a Polyalkylene Benzenedicarboxylate Material Comparative Method 1-1

Blue polyethylene terephthalate (PET) flakes (prepared from a commercially available PET bottle of Schweppes® Sparkling Water manufactured by the Coca-Cola Company) having a size of 1 cm×1 cm were subjected to a heating treatment at 190° C. in air for 20 minutes, such that heated polyester flakes were obtained. The heated polyester flakes were subjected to an impact fracturing treatment at one atmosphere and room temperature (about 25° C.) using a hammer, thereby obtaining a comparative impact-fractured polyester material.

Comparative Methods 1-2 to 1-8

Comparative Methods 1-2 to 1-8 were similar to Comparative Method 1-1, except that at least one of the temperature and time for the heating treatment was modified as shown in Table 1 below.

Exemplary Method 1-1 According to Present Disclosure

Blue PET flakes (prepared from a commercially available PET bottle of Schweppes® Sparkling Water manufactured by the Coca-Cola Company) having a size of 1 cm×1 cm were subjected to an immersion treatment in ethylene glycol at one atmosphere and 170° C. for 60 minutes. Subsequently, filtration and drying were conducted. Therefore, immersed polyester flakes were obtained.

The immersed polyester flakes were subjected to an impact fracturing treatment at one atmosphere and room temperature (about 25° C.) using a hammer, thereby obtaining an exemplary impact-fractured polyester material.

Exemplary Methods 1-2 to 1-8 According to Present Disclosure

Exemplary Methods 1-2 to 1-8 were similar to Exemplary Method 1-1, except that at least one of the temperature and time for the immersion treatment was modified as shown in Table 2 below.

A2-1. Characteristic Evaluation

Analysis of Appearance

Figure 2:
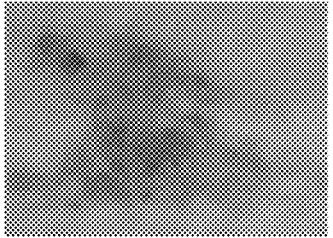
FIG. 2 shows appearance of exemplary impact-fractured polyester materials obtained using Exemplary Methods 1-1 to 1-8 according to the present disclosure.
Figure 2:
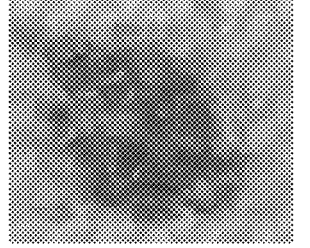
Figure 2:
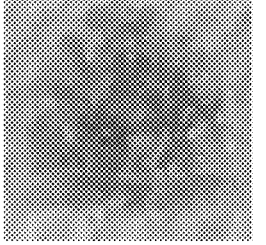
Figure 2:
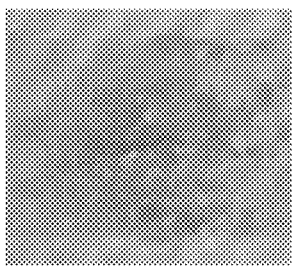
Figure 2:
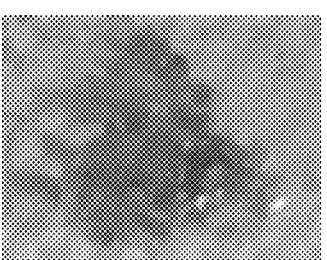
Figure 2:
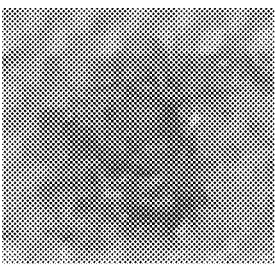
Figure 2:
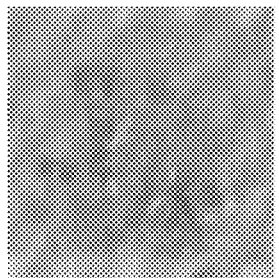
Figure 2:
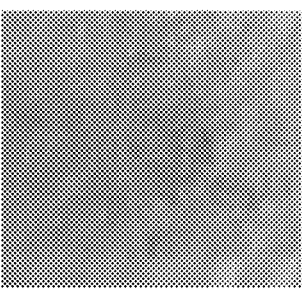

The exemplary impact-fractured polyester materials obtained using Exemplary Methods 1-1 to 1-8 and the comparative impact-fractured polyester materials obtained using Comparative Methods 1-1 to 1-8 were photographed. The results are shown in FIGS. 1 and 2 below.

Size Determination

The exemplary impact-fractured polyester materials obtained using Exemplary Methods 1-1 to 1-8 and the comparative impact-fractured polyester materials obtained using Comparative Methods 1-1 to 1-8 were subjected to size determination using a scanning electron microscope (manufacturer: Nova™; model: NanoSEM 230). The results are shown in Tables 1 and 2 below.

Crystallinity Determination

Figure 3:
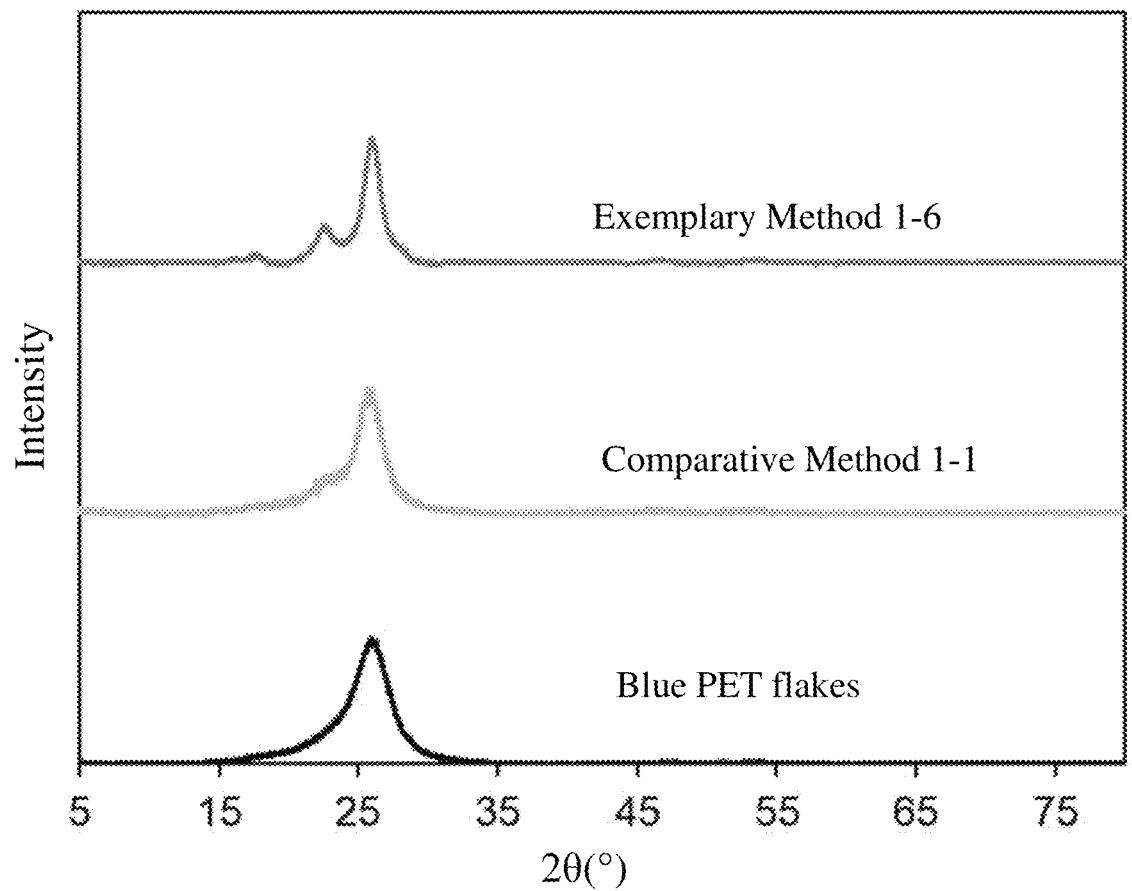
FIG. 3 shows X-ray diffractograms of immersed polyester flakes obtained during Exemplary Method 1-6 according to the present disclosure, heated polyester flakes obtained during Comparative Method 1-1, and blue polyethylene terephthalate (PET) flakes used in Exemplary Method 1-6 and Comparative Method 1-1, the X-ray diffractograms indicating crystallinity of the immersed polyester flakes, the heated polyester flakes, and the blue PET flakes.

The immersed polyester flakes obtained during Exemplary Method 1-6 and the heated polyester flakes obtained during Comparative Method 1-1 were subjected to crystallinity determination using an X-ray diffractometer (manufacturer: Rigaku; model: SmartLab SE). In addition, the blue PET flakes used in Exemplary Method 1-6 and Comparative Method 1-1, which were identical, were subjected to the same crystallinity determination. The results are shown in FIG. 3.

A2-2. Results of Characteristic Evaluation

TABLE 1

| | | Heating treatment | | Characteristics of resulting comparative impact-fractured polyester material | |
|---|---|---|---|---|---|
| | | Temperature (° C.) | Time (minutes) | Size | Color |
| Comparative Method | 1-1 | 190 | 20 | >1 mm | Blue |
| | 1-2 | 190 | 60 | >1 mm | Blue |
| | 1-3 | 230 | 20 | >1 mm | Blue |
| | 1-4 | 230 | 40 | >1 mm | Blue |
| | 1-5 | 230 | 60 | >1 mm | Blue |
| | 1-6 | 250 | 20 | >1 mm | Slightly yellowed |
| | 1-7 | 250 | 40 | >1 mm | Slightly yellowed |
| | 1-8 | 250 | 60 | >1 mm | Slightly yellowed |

TABLE 2

| | | Immersion treatment | | Characteristics of resulting exemplary impact-fractured polyester material | |
|---|---|---|---|---|---|
| | | Temperature (° C.) | Time (minutes) | Size | Color |
| Exemplary Method | 1-1 | 170 | 60 | <0.5 mm | Light blue |
| | 1-2 | 180 | 20 | <0.5 mm | Light blue |
| | 1-3 | 180 | 30 | <0.5 mm | Light blue |
| | 1-4 | 180 | 40 | <0.5 mm | Light blue |
| | 1-5 | 190 | 10 | <0.5 mm | Light blue |
| | 1-6 | 190 | 20 | <0.5 mm | Light blue |
| | 1-7 | 190 | 30 | <0.5 mm | Light blue |
| | 1-8 | 190 | 40 | <0.5 mm | Light blue |

Comparative Methods 1-1 to 1-8 correspond to the processing method disclosed in U.S. Pat. No. 7,380,735. As shown in FIGS. 1 and 2 and Tables 1 and 2, under the same condition of impact fracturing treatment, the blue PET flakes could become unsolid or fractured after being subjected to the heating treatment only at 230° C. for 40 minutes or at 250° C. (as demonstrated by Comparative Methods 1-1 to 1-8), while the blue PET flakes could change their appearance and structure after being subjected to the immersion treatment in ethylene glycol and at 170° C. to 190° C. (as demonstrated by Exemplary Methods 1-1 to 1-8). Therefore, compared to the processing method of U.S. Pat. No. 7,380,735, the processing method of the present disclosure requires a relatively low temperature and hence is not energy-consuming.

Furthermore, under the same condition of impact fracturing treatment and the same processing temperature and time (i.e. 190° C. and 20 minutes), the blue PET flakes did not have a significant change in appearance during Comparative Method 1-2, while the blue PET flakes became unsolid or fractured due to the immersion treatment during Exemplary Method 1-6. Thus, compared to the processing method of U.S. Pat. No. 7,380,735, the processing method of the present disclosure can easily provide a fractured polyester material in a shorter time, hence only requiring low energy and having high disintegration efficiency.

In addition, referring to FIG. 3, since the heated polyester flakes obtained during Comparative Method 1-1 and the immersed polyester flakes obtained during Exemplary Method 1-6 exhibited three characteristic peaks respectively at $2\theta=18°$, $2\theta=23.4°$, and $2\theta=25.8°$, it can be inferred that these characteristic peaks respectively corresponded to the following lattice planes of PET: (010), (110), and (100). Therefore, both Comparative Method 1-1 and Exemplary Method 1-6 could lead to PET with crystallinity.

Moreover, as shown in FIG. 3, the characteristic peaks of the heated polyester flakes obtained during Comparative Method 1-1 respectively had intensities of 1851 a.u. (arbitrary unit), 4883 a.u., and 14406 a.u., and respectively had full widths at half maximum (FWHM) that were 1.2, 1.5, and 0.9. On the other hand, the characteristic peaks of the immersed polyester flakes obtained during Exemplary Method 1-6 respectively had intensities of 10222 a.u., 26567 a.u., and 66050 a.u, and respectively had FWHM that were 0.6, 0.8, and 0.9. Compared to the intensities and FWHM of the characteristic peaks of the heated polyester flakes obtained during Comparative Method 1-1, the intensities and FWHM of the characteristic peaks of the immersed polyester flakes obtained during Exemplary Method 1-6 were respectively stronger and narrower, indicating that the immersed polyester flakes obtained during Exemplary Method 1-6 (i.e. the processing method of the present disclosure) had higher crystallinity than that of the heated polyester flakes obtained during Comparative Method 1-1 (i.e. the conventional method of U.S. Pat. No. 7,380,735). Based on the aforesaid results, it can be inferred that under the same processing time, the processing method of the present disclosure can provide a polyester material having high crystallinity in a shorter time compared to the method of U.S. Pat. No. 7,380,735.

B1. Further Exemplary and Comparative Methods for Processing a Polyalkylene Benzenedicarboxylate Material Comparative Method 2-1

0.4 g of blue PET flakes (prepared from a commercially available PET bottle of Schweppes® Sparkling Water manufactured by the Coca-Cola Company) having a size of 1 cm×1 cm were subjected to a decolorization treatment by immersion in 10 mL of ethylene glycol at 180° C. for 40 minutes. Filtration and drying were then conducted. Thus, a comparative decolorized polyester material (0.4 g) was obtained.

Comparative Methods 2-2 to 2-4

Comparative Methods 2-2 to 2-4 were similar to Comparative Method 2-1, except that the time for the decolorization treatment was modified as shown in Table 3 below.

Exemplary Method 2-1 According to Present Disclosure 0.4 g of blue PET flakes (prepared from a commercially available PET bottle of Schweppes® Sparkling Water manufactured by the Coca-Cola Company) having a size of 1 cm×1 cm were subjected to an immersion treatment in 10 mL of ethylene glycol at one atmosphere and 180° C. for 30 minutes. Subsequently, filtration and drying were conducted. Therefore, immersed polyester flakes (0.4 g) were obtained.

0.4 g of the immersed polyester flakes were subjected to an impact fracturing treatment at one atmosphere and room temperature (about 25° C.) using a hammer, thereby obtaining an impact-fractured polyester material (0.4 g) having a size of 0.5 mm or smaller.

0.4 g of the impact-fractured polyester material was subjected to a decolorization treatment by immersion in 10 mL of ethylene glycol at 180° C. for 30 minutes. Filtration and drying were then conducted. Thus, an exemplary decolorized polyester material (0.4 g) was obtained.

Exemplary Method 2-2 According to Present Disclosure

Exemplary Method 2-2 was similar to Exemplary Method 2-1, except that the time for the decolorization treatment was modified as shown in Table 3 below.

B2-1. Characteristic Evaluation
Determination of Reflection Rate

The exemplary decolorized polyester materials obtained using Exemplary Methods 2-1 and 2-2 and the comparative decolorized polyester materials obtained using Comparative Methods 2-1 to 2-4 were subjected to determination of reflection rate for light having a wavelength of 637 nm using a UV-VIS (ultraviolet-visible) spectrophotometer (Jasco, V-670). In addition, the blue PET flakes used in Exemplary Methods 2-1 and 2-2 and Comparative Methods 2-1 to 2-4, which were identical, were subjected to the same determination of reflection rate. The results are shown in Table 3 below.

B2-2. Results of Characteristic Evaluation

TABLE 3

| | | Time for decolorization treatment (minutes) | Reflection rate (%) |
|---|---|---|---|
| Blue PET flakes | | — | 30 |
| Comparative Method 2-1 | Resulting comparative decolorized polyester material | 40 | 56 |
| Comparative Method 2-2 | Resulting comparative decolorized polyester material | 60 | 61 |
| Comparative Method 2-3 | Resulting comparative decolorized polyester material | 120 | 68 |
| Comparative Method 2-4 | Resulting comparative decolorized polyester material | 300 | 87 |
| Exemplary Method 2-1 | Resulting exemplary decolorized polyester material | 40 | 85 |
| Exemplary Method 2-2 | Resulting exemplary decolorized polyester material | 60 | 90 |

As shown in Table 3, regarding Exemplary Method 2-2 employing an immersion treatment and an impact fracturing treatment, the resulting exemplary decolorized polyester material had a reflection rate of 90% even though Exemplary Method 2-2 employed only a 60-minute decolorization treatment. However, regarding Comparative Method 2-4 that did not employ an immersion treatment and an impact fracturing treatment, the resulting comparative decolorized polyester material had a reflection rate of only 87% even though Comparative Method 2-4 employed a 300-minute decolorization treatment. Furthermore, Exemplary Method 2-1 could achieve a satisfactory reflection rate in only 40 minutes compared to Comparative Methods 2-1 to 2-3. The aforesaid results indicate that the processing method of the present disclosure, by virtue of the immersion treatment and the impact fracturing treatment (i.e. disintegration treatment) thereof, can shorten the time required for the subsequent decolorization treatment and achieve an excellent decolorization effect.

C1. Still Further Exemplary and Comparative Methods for Processing a Polyalkylene Benzenedicarboxylate Material
Comparative Method 3

0.06 g of blue PET flakes (prepared from a commercially available PET bottle of Schweppes® Sparkling Water manufactured by the Coca-Cola Company) having a size of 1 cm×1 cm, 0.06 g of green PET flakes (prepared from a commercially available PET bottle of Mini-oligowater manufactured by King Car Industrial Co., Ltd.) having a size of 1 cm×1 cm, 0.06 g of green PET flakes (prepared from a commercially available PET bottle of Sprite manufactured by the Coca-Cola Company) having a size of 1 cm×1 cm, 0.06 g of light blue PET flakes (prepared from a commercially available PET bottle of ocean alkaline ion water manufactured by Taiyen Biotech Co., Ltd.) having a size of 1 cm×1 cm, and 0.06 g of transparent PET flakes (prepared from a commercially available PET bottle of Coca-Cola manufactured by the Coca-Cola Company) having a size of 1 cm×1 cm were mixed, so as to obtain polyester flakes with mixed colors.

The polyester flakes with mixed colors were subjected to a decolorization treatment by immersion in 10 mL of ethylene glycol at 180° C. for 60 minutes. Filtration and drying were then conducted. Thus, a comparative decolorized polyester material was obtained.

Exemplary Method 3 According to Present Disclosure

Polyester flakes with mixed colors were prepared using the procedure for preparing those used in Comparative Method 3.

0.3 g of the polyester flakes with mixed colors were subjected to an immersion treatment in 10 mL of ethylene glycol at one atmosphere and 180° C. for 20 minutes. Subsequently, filtration and drying were conducted. Therefore, immersed polyester flakes with mixed colors were obtained.

0.3 g of the immersed polyester flakes with mixed colors were subjected to an impact fracturing treatment at one atmosphere and room temperature (about 25° C.) using a hammer, thereby obtaining an impact-fractured polyester material with mixed colors (0.3 g) having a size of 0.5 mm or smaller.

The impact-fractured polyester material with mixed colors was subjected to a decolorization treatment by immersion in 10 mL of ethylene glycol at 180° C. for 60 minutes. Filtration and drying were then conducted. Thus, an exemplary decolorized polyester material was obtained.

C2-1. Characteristic Evaluation
Determination of Reflection Rate

The exemplary decolorized polyester material obtained using Exemplary Method 3 and the comparative decolorized polyester material obtained using Comparative Method 3 were subjected to determination of reflection rate for light having a wavelength ranging from 300 nm to 800 nm using a UV-VIS spectrophotometer (Jasco, V-670). In addition, the polyester flakes with mixed colors used in Exemplary Method 3 and Comparative Method 3, which were identical, were subjected to the same determination of reflection rate. The results are shown in FIG. 4.

C2-2. Results of Characteristic Evaluation

Figure 4:
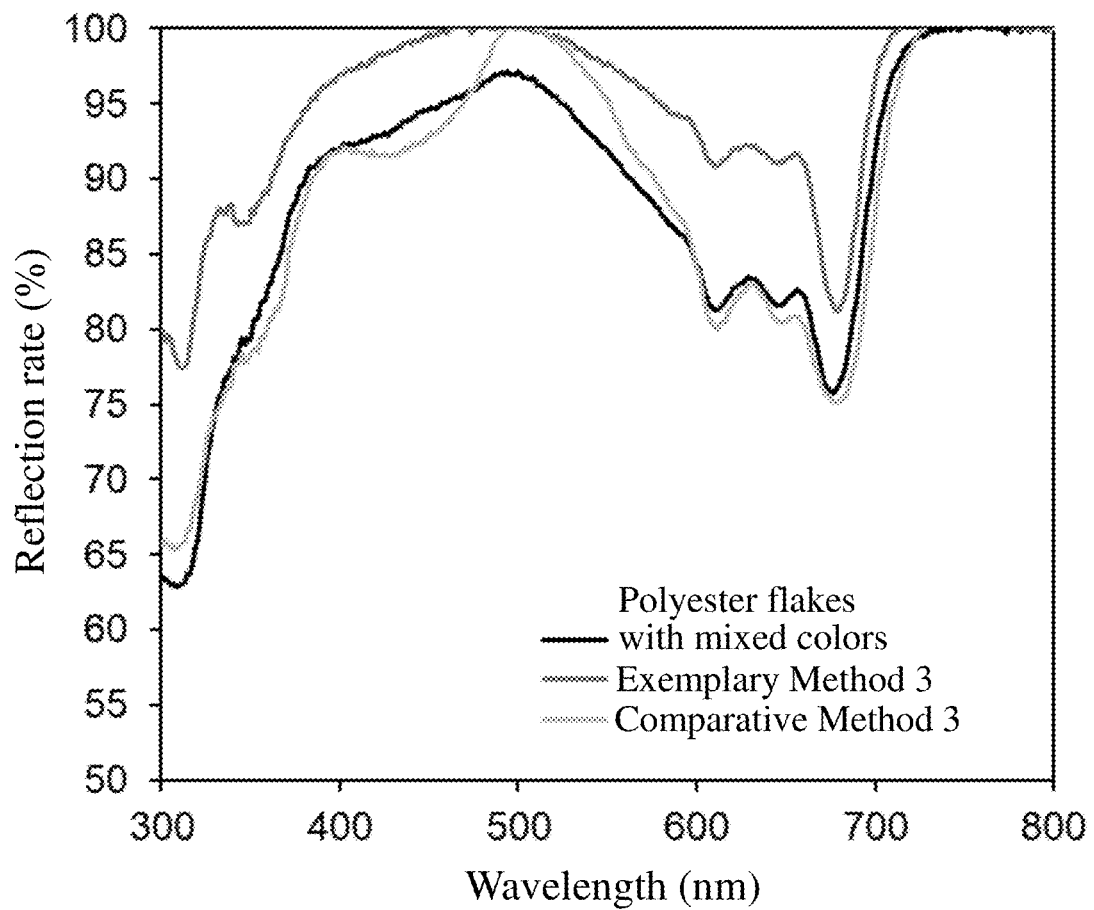
FIG. 4 shows ultraviolet-visible spectra of an exemplary decolorized polyester material obtained using Exemplary Method 3 according to the present disclosure, a comparative decolorized polyester material obtained using Comparative Method 3, and polyester flakes with mixed colors used in Exemplary Method 3 and Comparative Method 3, the ultraviolet-visible spectra indicating reflection rates of the exemplary decolorized polyester material, the comparative decolorized polyester material, and the polyester flakes with mixed colors.

Referring to FIG. 4, regarding Exemplary Method 3 employing an immersion treatment and an impact fracturing treatment, the resulting exemplary decolorized polyester material had a significantly enhanced reflection rate (for light having a wavelength ranging from 300 nm to 800 nm) compared to the polyester flakes with mixed colors. However, regarding Comparative Method 3 that did not employ an immersion treatment and an impact fracturing treatment, the resulting comparative decolorized polyester material generally had a reflection rate (for light having a wavelength ranging from 300 nm to 800 nm) similar to that of the polyester flakes with mixed colors. The aforesaid results indicate that the processing method of the present disclosure, by virtue of the immersion treatment and the impact fracturing treatment (i.e. disintegration treatment) thereof, can achieve an excellent decolorization effect.

D1. Yet Still Further Exemplary and Comparative Methods for Processing a Polyalkylene Benzenedicarboxylate Material Comparative Method 4-1

0.4 g of light blue PET flakes (prepared from a commercially available PET bottle of ocean alkaline ion water manufactured by Taiyen Biotech Co., Ltd.) having a size of 1 cm×1 cm were subjected to a decolorization treatment by immersion in 10 mL of dibenzyl ether at 180° C. for 60 minutes. Filtration and drying were then conducted. Thus, a comparative decolorized polyester material (0.4 g) was obtained.

Comparative Methods 4-2 to 4-6

Comparative Methods 4-2 to 4-6 were similar to Comparative Method 4-1, except that the time for the decolorization treatment was modified as shown in Table 4 below.

Exemplary Method 4-1 According to Present Disclosure 0.4 g of light blue PET flakes (prepared from a commercially available PET bottle of ocean alkaline ion water manufactured by Taiyen Biotech Co., Ltd.) having a size of 1 cm×1 cm were subjected to an immersion treatment in 10 mL of ethylene glycol at one atmosphere and 180° C. for 60 minutes. Subsequently, filtration and drying were conducted. Therefore, immersed polyester flakes (0.4 g) were obtained.

0.4 g of the immersed polyester flakes were subjected to an impact fracturing treatment at one atmosphere and room temperature (about 25° C.) using a hammer, thereby obtaining an impact-fractured polyester material (0.4 g) having a size of 0.5 mm or smaller.

0.4 g of the impact-fractured polyester material was subjected to a decolorization treatment by immersion in 10 mL of dibenzyl ether at 180° C. for 40 minutes. Filtration and drying were then conducted. Thus, an exemplary decolorized polyester material (0.4 g) was obtained.

Exemplary Methods 4-2 to 4-6 According to Present Disclosure

Exemplary Methods 4-2 to 4-6 were similar to Exemplary Method 4-1, except that the time for the decolorization treatment was modified as shown in Table 4 below.

D2-1. Characteristic Evaluation

Determination of Reflection Rate

The exemplary decolorized polyester materials obtained using Exemplary Methods 4-1 to 4-6 and the comparative decolorized polyester materials obtained using Comparative Methods 4-1 to 4-6 were subjected to determination of reflection rate for light having a wavelength of 679 nm using a UV-VIS spectrophotometer (Jasco, V-670). In addition, the light blue PET flakes used in Exemplary Methods 4-1 to 4-6 and Comparative Methods 4-1 to 4-6, which were identical, were subjected to the same determination of reflection rate. The results are shown in FIG. 4 below.

D2-2. Results of Characteristic Evaluation

TABLE 4

|  |  | Time for decolorization treatment (minutes) | Reflection rate (%) |
|---|---|---|---|
| Light blue PET flakes |  | — | 24 |
| Comparative Method 4-1 | Resulting comparative decolorized polyester material | 60 | 63 |
| Comparative Method 4-2 | Resulting comparative decolorized polyester material | 120 | 63 |
| Comparative Method 4-3 | Resulting comparative decolorized polyester material | 180 | 76 |
| Comparative Method 4-4 | Resulting comparative decolorized polyester material | 240 | 86 |
| Comparative Method 4-5 | Resulting comparative decolorized polyester material | 300 | 90 |
| Comparative Method 4-6 | Resulting comparative decolorized polyester material | 360 | 88 |
| Exemplary Method 4-1 | Resulting exemplary decolorized polyester material | 60 | 90 |
| Exemplary Method 4-2 | Resulting exemplary decolorized polyester material | 120 | 93 |
| Exemplary Method 4-3 | Resulting exemplary decolorized polyester material | 180 | 94 |
| Exemplary Method 4-4 | Resulting exemplary decolorized polyester material | 240 | 93 |
| Exemplary Method 4-5 | Resulting exemplary decolorized polyester material | 300 | 93 |
| Exemplary Method 4-6 | Resulting exemplary decolorized polyester material | 360 | 93 |

As shown in Table 4, regarding Exemplary Method 4-1 employing an immersion treatment and an impact fracturing treatment, the resulting exemplary decolorized polyester material had a reflection rate of 90% even though Exemplary Method 4-1 employed only a 60-minute decolorization treatment. However, regarding Comparative Method 4-5 that did not employ an immersion treatment and an impact fracturing treatment, the resulting comparative decolorized polyester material had a reflection rate of only 90% even though Comparative Method 4-5 employed a 300-minute decolorization treatment. Furthermore, Comparative Method 4-6 required 360 minutes of decolorization to achieve a decolorization effect that could barely match with that of Exemplary Method 4-1 requiring only 60 minutes of decolorization. The aforesaid results indicate that the processing method of the present disclosure, by virtue of the immersion treatment and the impact fracturing treatment (i.e. disintegration treatment) thereof, can shorten the time required for the subsequent decolorization treatment and achieve an excellent decolorization effect.

E1. Another Yet Still Further Exemplary and Comparative Methods for Processing a Polyalkylene Benzenedicarboxylate Material Comparative Method 5

5 g of PET chips (manufacturer: LIBOLON; specification: white and bottle grade) having a size of 2 mm×2 mm×2 mm, 30 mL of ethylene glycol, and 1 g of a zinc metal were mixed, and depolymerization was allowed to proceed at 190° C. for 150 minutes. Filtration was then conducted to obtain a filter cake and a filtrate containing bis(2-hydroxyethyl) terephthalate.

Exemplary Method 5

5 g of PET chips (manufacturer: LIBOLON; specification: white and bottle grade) having a size of 2 mm×2 mm×2 mm were subjected to an immersion treatment in 30 mL of ethylene glycol at one atmosphere and 190° C. for 20 minutes. Subsequently, filtration and drying were conducted. Therefore, immersed polyester chips (5 g) were obtained.

5 g of the immersed polyester chips were subjected to an impact fracturing treatment at one atmosphere and room temperature (about 25° C.) using a hammer, thereby obtaining an impact-fractured polyester material (5 g) having a size of 0.5 mm or smaller.

5 g of the impact-fractured polyester material, 30 mL of ethylene glycol, and 1 g of a zinc metal were mixed, and depolymerization was allowed to proceed at 190° C. for 150 minutes. Filtration was then conducted to obtain a filter cake and a filtrate containing bis(2-hydroxyethyl) terephthalate.

E2-1. Performance Evaluation

Determination of PET Chip Conversion Rate

Each of Exemplary Method 5 and Comparative Method 5 was subjected to determination of rate of conversion from PET chips to bis(2-hydroxyethyl) terephthalate (abbreviated as PET chip conversion rate hereinafter) using the following equation (I):

$$A=(B-C)/B\times 100\% \quad (I)$$

where A=PET conversion rate (%)
B=amount of PET chips used (g)
AC=amount of filter cake gained (g)

The results are shown in Table 5 below.

E2-2. Results of Performance Evaluation

TABLE 5

| | Exemplary Method 5 | Comparative Method 5 |
|---|---|---|
| PET chip conversion rate (%) | 98.5 | 42.4 |

As shown in Table 5, regarding Exemplary Method 5 employing an immersion treatment and an impact fracturing treatment, the resulting PET chip conversion rate was 98.5%. However, regarding Comparative Method 5 that did not employ an immersion treatment and an impact fracturing treatment, the resulting PET chip conversion rate was only 42.4%. The aforesaid results indicate that the processing method of the present disclosure, by virtue of the immersion treatment and the impact fracturing treatment (i.e. disintegration treatment) thereof, can enhance the rate of conversion from PET chips to bis(2-hydroxyethyl) terephthalate and hence exhibit an excellent depolymerization effect.

In sum, the processing method of the present disclosure, by virtue of the immersion treatment thereof, can effectively shorten the time for the disintegration treatment (e.g. impact fracturing treatment), such that a disintegrated polyester material can be easily obtained (namely, the disintegration efficiency is excellent). Furthermore, the disintegrated polyester material can greatly improve the efficiency of the subsequent decolorization and depolymerization treatments. Therefore, the processing method of the present disclosure is satisfactory.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for processing a polyalkylene benzenedicarboxylate material, comprising:
    subjecting a polyalkylene benzenedicarboxylate material to an immersion treatment with an immersion liquid including ethylene glycol, so as to obtain an immersed polyester material, the immersed polyester material having crystallinity higher than that of the polyalkylene benzenedicarboxylate material; and
    subjecting the immersed polyester material to a disintegration treatment to obtain a disintegrated polyester material.

2. The method as claimed in claim 1, wherein the immersion treatment is conducted at a temperature ranging from 150° C. to 195° C. for 0.5 minute to 480 minutes.

3. The method as claimed in claim 1, wherein the polyalkylene benzenedicarboxylate material is a colored polyalkylene benzenedicarboxylate material that is colorized by a colorant, and the disintegrated polyester material obtained from the colored polyalkylene benzenedicarboxylate material is a colored disintegrated polyester material that is colorized by the colorant, the method further comprising subjecting the colored disintegrated polyester material to a decolorization treatment so as to remove the colorant from the colored disintegrated polyester material.

4. The method as claimed in claim 3, wherein the decolorization treatment is selected from the group consisting of a chemical decolorization treatment and a physical decolorization treatment.

5. The method as claimed in claim 4, wherein the physical decolorization treatment is selected from the group consisting of a solvent extraction treatment and a solvent vapor treatment.

6. The method as claimed in claim 5, wherein the physical decolorization treatment is a solvent extraction treatment.

7. The method as claimed in claim 5, wherein the physical decolorization treatment is conducted using a decolorization composition including at least one decolorization agent selected from the group consisting of ethylene glycol,

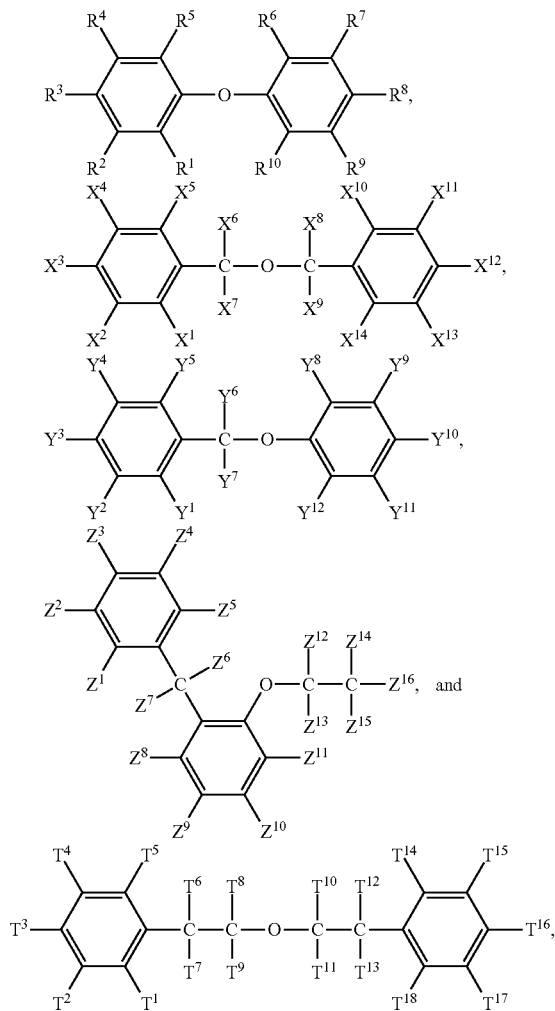

where $R^1, R^2, R^3, R^4, R^5, R^6, R^7, R^8, R^9, R^{10}, X^1, X^2, X^3, X^4, X^5, X^6, X^7, X^8, X^9, X^{10}, X^{11}, X^{12}, X^{13}, X^{14}, Y^1, Y^2, Y^3, Y^4, Y^5, Y^6, Y^7, Y^8, Y^9, Y^{10}, Y^{11}, Y^{12}, Z^1, Z^2, Z^3, Z^4, Z^5, Z^6, Z^7, Z^8, Z^9, Z^{10}, Z^{11}, Z^{12}, Z^{13}, Z^{14}, Z^{15}, T^1, T^2, T^3, T^4, T^5, T^6, T^7, T^8, T^9, T^{10}, T^{11}, T^{12}, T^{13}, T^{14}, T^{15}, T^{16}, T^{17}$ and $T^{18}$ are independently selected from the group consisting of hydrogen and a hydrocarbon group.

8. The method as claimed in claim 7, wherein the physical decolorization treatment is conducted at a temperature lower than a boiling point of the decolorization composition.

9. The method as claimed in claim 8, wherein the physical decolorization treatment is conducted at a temperature of 230° C. or lower for 0.5 minute to 480 minutes.

10. The method as claimed in claim 9, wherein the physical decolorization treatment is conducted at a temperature ranging from 100° C. to 195° C.

11. The method as claimed in claim 1, wherein the disintegrated polyester material includes powder or separate fragments of the immersed polyester material, and the method further comprises subjecting the disintegrated polyester material to a depolymerization treatment after the disintegration treatment.

12. The method as claimed in claim 11, wherein the depolymerization treatment is selected from the group consisting of an alcoholysis treatment, a hydrolysis treatment, an aminolysis treatment, and an ammonolysis treatment.

13. The method as claimed in claim 12, wherein the depolymerization treatment is the alcoholysis treatment.

14. The method as claimed in claim 13, wherein the alcoholysis treatment is conducted using an alcoholysis composition including ethylene glycol.

15. The method as claimed in claim 14, wherein the alcoholysis treatment is conducted at a temperature lower than a boiling point of the alcoholysis composition.

16. The method as claimed in claim 15, wherein the alcoholysis treatment is conducted at a temperature of 196° C. or lower for 0.5 minute to 480 minutes.

17. The method as claimed in claim 16, wherein the alcoholysis treatment is conducted at a temperature ranging from 160° C. to 196° C.

18. The method as claimed in claim 11, wherein the depolymerization treatment is conducted in the presence of a metal catalyst.

19. The method as claimed in claim 18, wherein the metal catalyst is selected from the group consisting of a zinc metal, zinc oxide, zinc acetate, zinc chloride, and combinations thereof.

20. The method as claimed in claim 19, wherein the zinc metal is a zinc electrode of a zinc-carbon battery.

* * * * *